United States Patent [19]
Chiang et al.

[11] Patent Number: 5,835,752
[45] Date of Patent: Nov. 10, 1998

[54] PCI INTERFACE SYNCHRONIZATION

[75] Inventors: Kevin Chiang, Fremont; Amjad Z. Qureshi, San Jose, both of Calif.

[73] Assignee: Samsung Electronics Co. Ltd., Rep. of Korea

[21] Appl. No.: 730,913

[22] Filed: Oct. 18, 1996

[51] Int. Cl.[6] ................................................. G06F 13/42
[52] U.S. Cl. ..................... 395/551; 395/556; 395/285; 327/141
[58] Field of Search ..................... 395/550, 551, 395/556; 375/111; 327/141

[56] References Cited

U.S. PATENT DOCUMENTS

| 5,434,996 | 7/1995 | Bell | 395/550 |
|---|---|---|---|
| 5,535,377 | 7/1996 | Parks | 395/550 |
| 5,600,824 | 2/1997 | Williams et al. | 395/551 |
| 5,664,165 | 9/1997 | Curry et al. | 395/556 |

*Primary Examiner*—Ayaz R. Sheikh
*Assistant Examiner*—Frantz Blanchard Jean
*Attorney, Agent, or Firm*—Skjerven, Morrill, MacPherson Franklin & Friel LLP; David T. Millers

[57] ABSTRACT

A PCI interface includes a PCI core that operates at the PCI bus frequency and glue logic which provides an interface to a higher frequency clock domain. The glue logic includes FIFO buffers for addresses and data coming from or going to the PCI bus, and synchronizers for control signals coming from or going to the PCI core. In one embodiment, a novel synchronizer includes three flip-flops at least two of which are JK flip-flops.

9 Claims, 5 Drawing Sheets

PCI INTERFACE SYNCHRONIZATION

BACKGROUND OF THE INVENTION

1. Field of the Invention

This invention relates to interfaces between devices using independent clock frequencies and particularly to synchronization circuitry in an interface to a PCI bus.

2. Description of Related Art

Computer systems commonly employ busses such as a PCI bus which operates at a frequency that is fixed by a standard. A device which attaches to such a bus must be able to receive and/or transmits signals which are synchronized with a bus clock signal. One way to handle bus communications is to operate the device according to a clock signal which is synchronized with the bus. This typically restricts the operating frequency of the device to either the same as the bus frequency or an integer multiple of the bus frequency.

Alternatively, if some of the components of the device are better operated at a frequency that is not a multiple of the bus frequency, separate clock domains can be created in the device. One clock domain connects to the bus and is synchronized with the bus clock. A second clock domain operates at the frequency desired for the other device components. Lack of synchronization between the clock domains can cause metastability problems because signals in one clock domain may be in transition when the other clock domain requires a steady binary voltage. This metastability can cause failures. Accordingly, bus interfaces are needed which avoid metastability but still allow a device to operate at a frequency which is independent of the bus frequency.

SUMMARY OF THE INVENTION

In accordance with an aspect of the invention, a bus interface circuit includes a clock domain operating at a bus frequency and a clock domain which operates according to a clock signal which is totally independent of a bus clock signal. FIFO buffers are used between the two clock domains for information such as data and address signals. Synchronizers synchronize control signals passed between the clock domains. In one embodiment, a device which connects to a PCI bus uses a clock signal at any selected frequency greater than the 33-MHz bus frequency, but has a PCI core that operates at the bus frequency. Data and addresses pass between the PCI core and the higher frequency domain via FIFO buffers. Synchronizers between the PCI core logic and the higher frequency domain synchronize control signals to avoid metastability problems.

A synchronizer for transmission from the PCI core to the higher frequency clock domain can be formed using a pair of flip-flops having clock inputs coupled to the higher frequency clock and an output terminal of one flip-flop coupled to an input terminal of the second flip-flop. A logic gate generates from the output signals of the two flip-flops a signal synchronized with the higher frequency clock signal.

In accordance with another aspect of the invention, a synchronizer for a control signal from a higher frequency clock domain to a lower frequency clock domain includes three flip-flop at least two of which are edge triggered JK flip-flops. The first and second JK flip-flops have clock terminal coupled to the higher frequency clock. The control signal is applied to a first input terminal of the first JK flip-flop, and an output signal from the second JK flip-flop is applied to a second input terminal of the first JK flip-flop. An output signal of the first JK flip-flop is applied to a logic gate having an output terminal coupled to a third flip-flop, typically a D flip-flop, which has a clock terminal coupled to a lower frequency clock. An output signal from the third flip-flop is synchronized with the lower frequency clock signal and is applied both to an input of the logic gate and to a second input of the second JK flip-flop. An input terminal of the second JK flip-flop is coupled to a constant voltage so that the output signal from the second flip-flop remains set for only a single clock cycle.

In operation, the first flip-flop shifts an edge of the input signal by one clock cycle of the higher frequency clock signal. The output signal of the first flip-flop is directed to a logic gate which changes the input signal to the third flip-flop. After the change, the third flip-flop generates an output signal having an edge synchronized with the lower frequency clock signal. The change in the output signal of the third flip-flop causes the logic gate to change the input signal to the third flip-flop again so that output signal from the third input signal remains asserted for a single clock cycle of the lower frequency clock signal. The output signal is also directed back to the second flip-flop which generates a one clock cycle pulse to reset the first flip-flop before the output signal of the third flip-flop is deasserted.

BRIEF DESCRIPTION OF THE DRAWINGS

Use of the same reference symbols in different figures indicates similar or identical items.

DETAILED DESCRIPTION OF THE PREFERRED EMBODIMENTS

A bus interface includes two clock domains: a clock domain operating at a bus frequency and a clock domain operating at a frequency that is independent of the bus frequency. The bus interface also includes glue circuitry between the two clock domains. The glue circuitry includes FIFO buffers for information such as data and addresses, and synchronizers for control signals transmitted between the clock domains.

In one embodiment, a host interface which connects to a PCI bus includes a PCI core that operates at the 33-MHz bus frequency and control circuits which operate according to a clock signal at a frequency greater 33 MHz. The PCI core controls reads and writes of data and addresses to FIFO buffers. The control circuits control complementary writes to and reads from the FIFO buffers. Synchronizers communicate control signals between the PCI core and the higher frequency control circuits while avoiding metastability problems.

Figure 1:
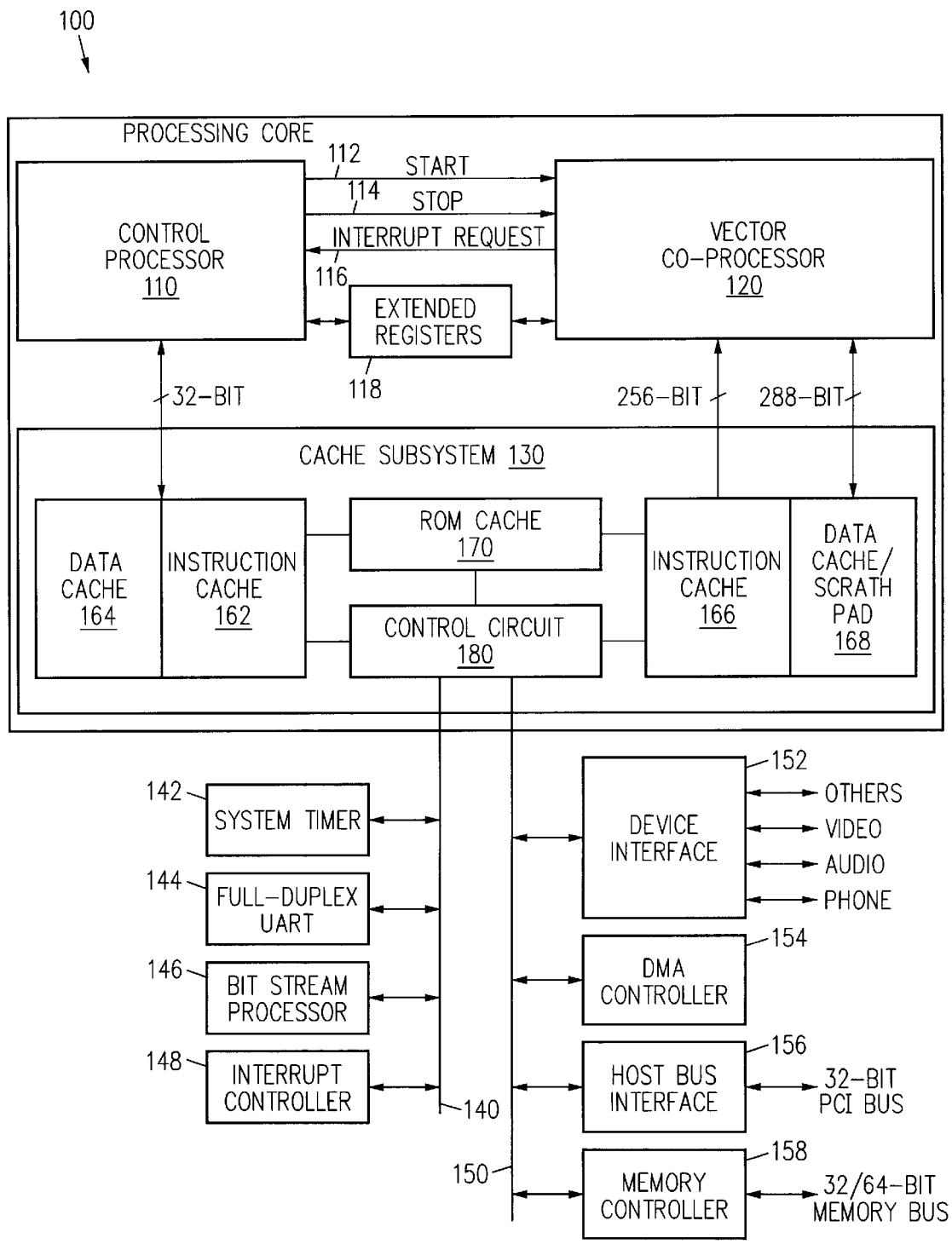
FIG. 1 is a block diagram of a signal processor in accordance with an embodiment of the invention.

FIG. 1 shows a block diagram of an exemplary a multimedia signal processor (MSP) 100 employing a host interface 156 in accordance with an embodiment of the invention. Signal processor 100 is an integrated multiprocessor which includes a general-purpose processor 110 and a vector processor 120. Processors 110 and 120 execute separate program threads and are structurally different for more efficient execution of particular tasks. In an exemplary embodiment of the invention, processor 210 implements the ARM7 architecture and instruction set described in the "ARM7DM Data Sheet", Document Number: ARM DDI 0010G which is available from Advance RISC Machines Ltd.; and vector processor 220 implements the instruction set described in U.S. patent application. Ser. No. 08/699, 597. Processor 110 executes a real-time operating system, exception routines for both processors 110 and 120, and general processes not requiring large numbers of repetitive calculations. Processor 110 also controls initialization, starting, and stopping of vector processor 120. Vector processor 120 performs number crunching including repetitive operations on large data blocks that are common in multimedia processing.

Processors 110 and 120 communicate with each other through direct lines 112, 114, and 116 or through extended registers 118 which processors 110 and 120 share. Processors 110 and 120 connect to the other on-chip components through a cache subsystem 130 which contains caches 162 and 164 for processor 110 and a cache 166 and a cache/scratch pad 168 for vector processor 120. Cache subsystem 130 also includes a ROM cache 170 and control circuitry 180.

Cache subsystem 130 connects processors 110 and 120 to two busses 140 and 150 and operates as a switching station for processor 110, processor 120, and the devices coupled to busses 140 and 150. U.S. patent application. Ser. No. 08/697,102 further describes operation of a cache subsystem as a switching station. Bus 140 which is sometimes referred to herein as IOBUS 140 connects to slower devices such as a system timer 142, a UART (universal asynchronous receiver transceiver) 144, a bitstream processor 146, and an interrupt controller 148. In an exemplary embodiment of the invention, IOBUS 140 operates at 40 MHz.

Bus 150, sometimes referred to herein as FBUS 150, operates at a higher clock frequency than bus 140 and is connected to faster devices such as a device interface 152, a DMA (direct memory access) controller 154, host interface 156, and a memory controller 158. In an exemplary embodiment of the invention, FBUS 150 operates at 80 MHz. Memory controller 158 and device interface 152 provide interfaces for an external memory and various analog-to-digital and digital-to-analog converters. DMA controller 154 controls DMA operations between the external memory and devices connected to device interface 152. Host interface 156 provides an interface to a host computer (not shown) and transmits information between FBUS 150 and a host bus operated at a frequency under the control of the host computer.

Figure 2:
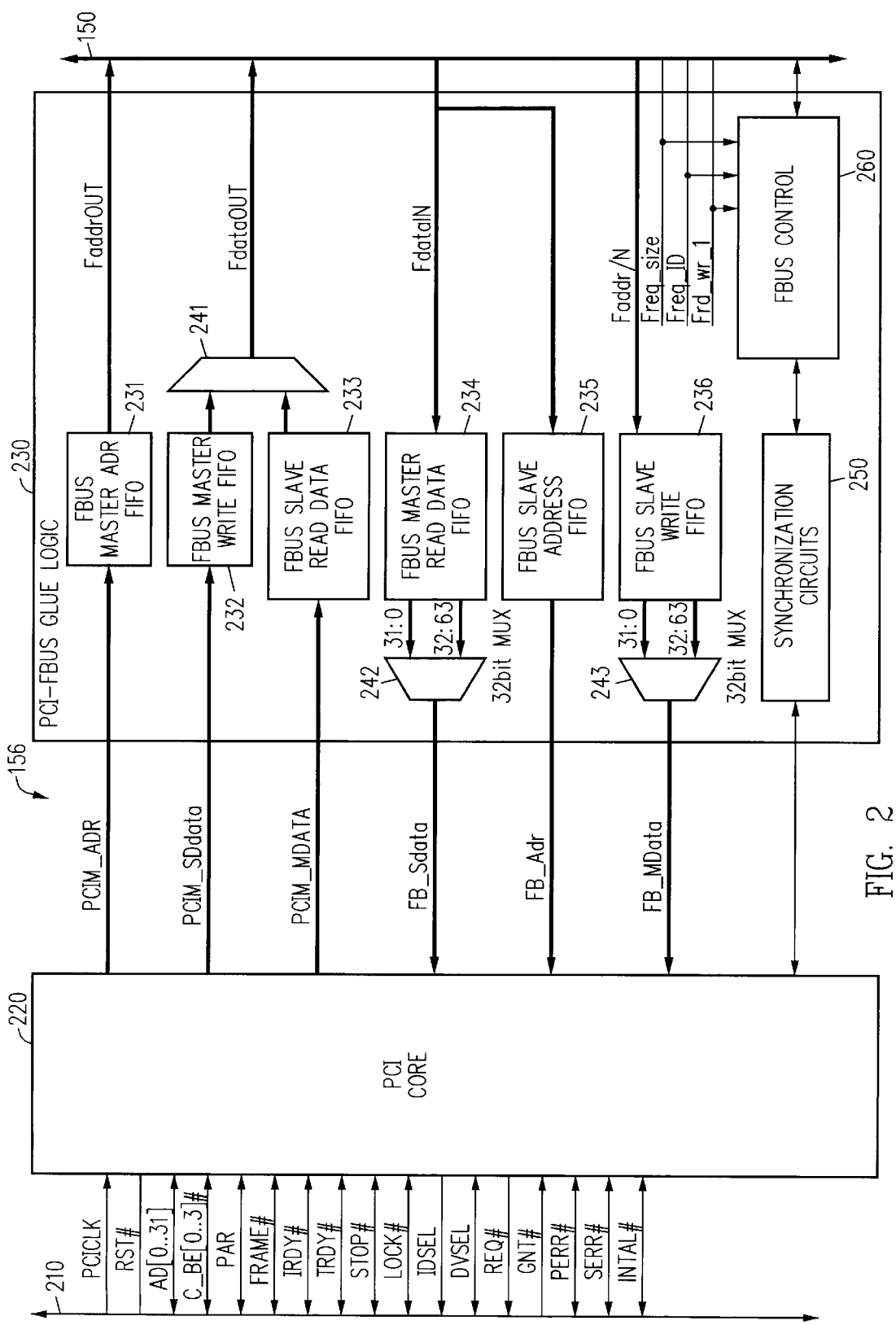
FIG. 2 is a block diagram of a host interface in accordance with an embodiment of the invention.

FIG. 2 shows a block diagram of an exemplary embodiment of the invention, where host interface 156, connects to a PCI (Peripheral Connection Interchange) bus 210. A PCI core 220 which is connected to PCI bus 210 implements an interface in compliance with the PCI Bus Specification, Revision 2.1 and operates according to a clock signal PCICLK from PCI bus 210. In particular, PCI core 220 performs functions including bus address decoding to identify signals on PCI bus 210 which are directed to processor 100, data reads and writes where processor 100 acts as a slave on PCI bus 210, and data reads and writes where processor 100 acts as bus master for PCI bus 210. Standard signals on PCI bus 210 include: input bus clock signal PCICLK; an input reset signal RST#; address and data signal AD[31:0]; control and byte enable signals C_BE0# to C_BE3#; parity bit PAR; cycle frame signal FRAME#; initiator ready signal IRDY#; target ready signal TRDY#; stop transaction signal STOP#; lock transaction signal LOCK#; initialization device select input signal IDSEL; device select signal DEVSEL; bus request signal REQ#; bus grant signal GNT#; parity error signal PERR#; system error signal SERR#; and interrupt A signal INTA#. The signal names ending with "#" indicate an active low signals.

PCI interface circuits such as PCI core 220 are well known in the art and are described, for example, by Mindshare, Inc., "PCI System Architecture," 3rd Edition, Addison-Wesley Publishing Co. (1995) which is incorporated by reference herein in its entirety. In an exemplary, embodiment of the invention PCI core 220 is a circuit licensed from Sand Micro, Inc.

PCI core 220 interprets signals on PCI bus 210 and generates appropriate responses. When a data transfer via PCI bus 210 is indicated, PCI core 220 accesses selected ones of FIFO buffers 231 to 235 to obtain or write address and data values required for the transfer. PCI core 220 also communicates with FBUS control circuit 260 via synchronizers 250 to indicate the type of data transfer. FBUS control 260 is responsible for obtaining access to FBUS 150 for data and/or address transfers to or from FIFOs 231 to 236. For example, for a write to local memory connected to processor 100, FBUS control 260 writes a data value FdataOUT from a FIFO buffer 232 or 233 to FBUS 150 with a target address FaddrOUT, and memory controller 158 completes the transfer to local memory. Similarly, when processor 110 wishes to send an interrupt to a device on PCI bus 210 or initiate a data transfer over PCI bus 210, processor 110 accesses FBUS control circuit 260 in host interface 156, and FBUS control 260 sends signals through synchronizers 250 to PCI core 220 to initiate the requested actions.

Figure 3:
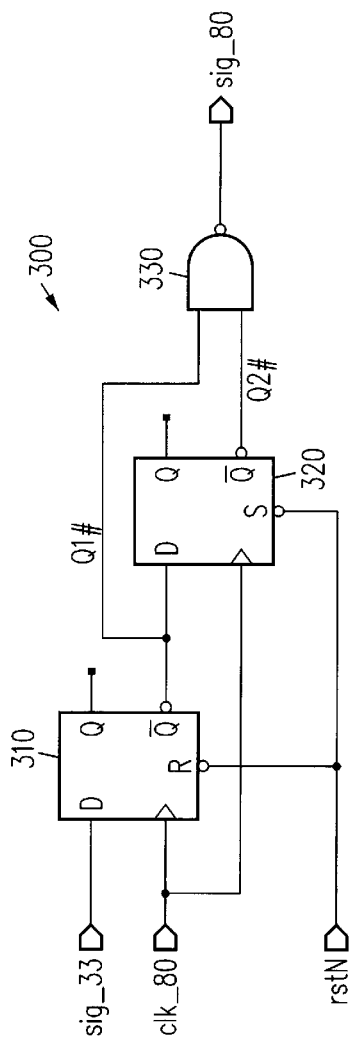
FIG. 3 is a circuit diagram for a synchronizer in accordance with an embodiment of the invention.

FIG. 3 shows a circuit diagram of a synchronizer 300 suitable for generating a signal sig_80 which is synchronized with a clock signal clk_80, from a signal sig_33 synchronized with signal clk_33. In the exemplary embodiment, signals clk_33 and clk_80 are respectively 33 MHz and 80 MHz clock signals, and signals sig_33 and sig_80 are respectively an output signal from PCI core 220 and a resulting input signal to FBUS control circuit 260. Signal sig_33 is applied to the data input terminal of an edge triggered D flip-flop 310 which is triggered by rising edges of signal clk_80. An output signal from flip-flop 310 is inverted and applied to a data input terminal of an edge triggered D flip-flop 320 which is also triggered by rising edges of signal clk_80. A NAND gate 330 generates output sig_80 from the inverted output signals Q1# and Q2# from flip-flops 310 and 320.

Figure 4:
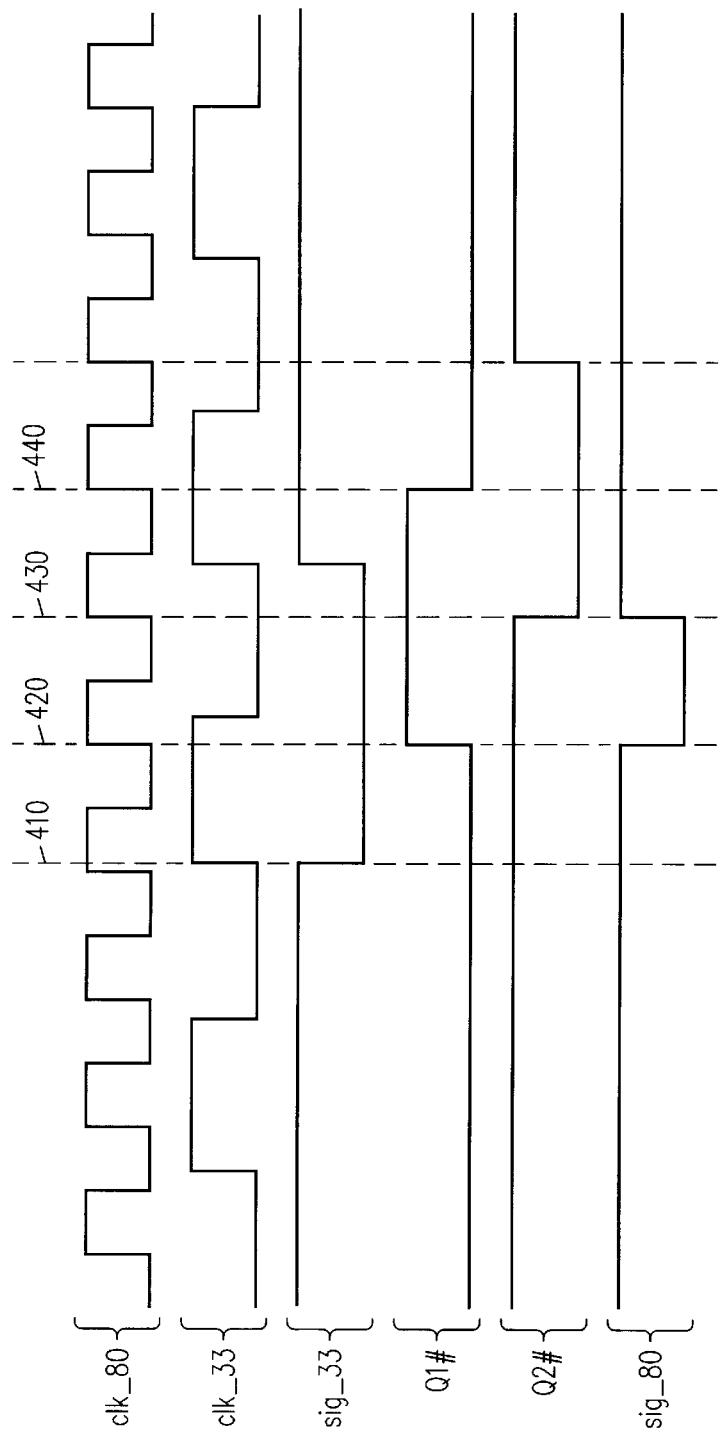
FIG. 4 is a timing diagram illustrating the operation of the synchronizer of FIG. 3.

FIG. 4 is a timing diagram illustrating operation of synchronizer 300. Clock signals clk_33 and clk_80 are respective clock signals for PCI core 220 and FBUS control logic 260 and have respective frequencies of 33 MHz and 80 MHz in the exemplary embodiment. An active low reset signal rstN initially sets circuit 300 so that signals Q1# and Q2# are respectively low and high and output signal sig_80 is high. At a time 410, signal sig_33 is asserted low in synchronization with a rising edge of clock signal clk_33. Control signals are asserted low for one full clock cycle of the 33-MHz bus clock. At time 420, while signal sig_33 is still asserted low, a rising edge of clock signal clk_80 triggers flip-flop 310 which raises signal Q1# high. At least one rising edge of clock signal clk_80 always occurs during a cycle of clock signal clk_33 (i.e. while signal sig_33 is low) because clock signal clk_80 operates at a higher frequency than clock signal clk_33.

Just after time 420, both signals Q1# and Q2# are high which causes NAND gate 330 to assert signal sig_80 low in synchronization with clock signal clk_80. Signal sig_80 remains low until time 430 when the next rising edge of clock signal clk_80 triggers flip-flop 320 which lowers output signal Q2# in response to signal Q1# being high. Signals Q1# and Q2# remain respectively high and low until a time 440 which corresponds to the first rising edge of clock signal clk_80 after signal sig_33 has returned to high. At time 440, signal Q1# transitions back to low, but output from NAND gate 330 remains high. At time 450, (the next rising edge of clock signal clk_80), signal Q2# returns to high so that circuit 300 is back in its initial state and ready for another pulse in signal sig_33.

An alternative embodiment of a synchronizer for signals sent from a lower frequency clock domain to a higher frequency clock domain uses an OR gate coupled to non-inverted output signals from two connected flip-flops.

Figure 5:
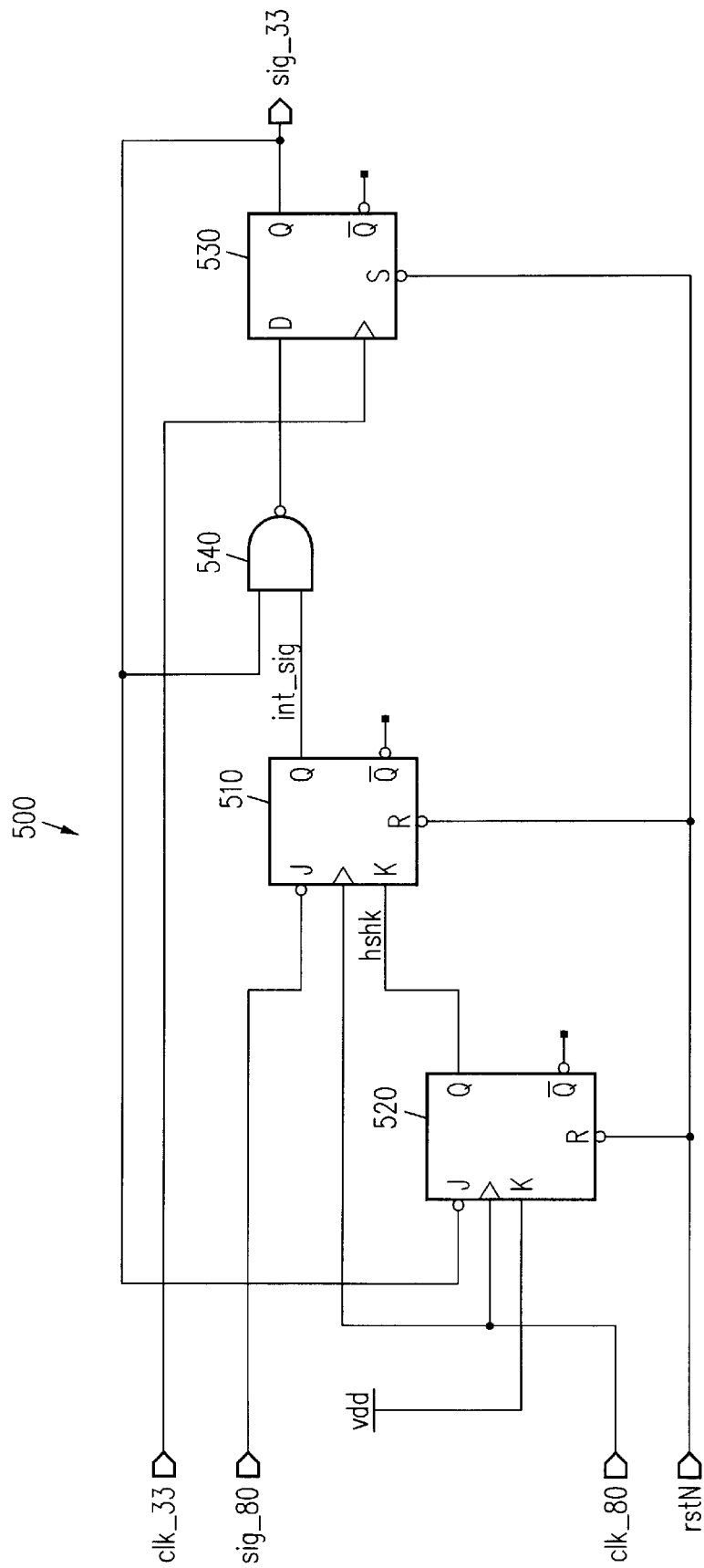
FIG. 5 is a circuit diagram for a synchronizer in accordance with another embodiment of the invention.

FIG. 5 shows a synchronizer 500 which generates a signal sig_33 which is synchronized with clock signal clk_33, from a signal sig_80 which is synchronized with clock signal clk_80. Synchronizer 500 includes a rising edge triggered JK flip-flop 510 having an inverted version of signal sig_80 applied to a J (or triggered set) terminal. Clock signal clk_80 is applied to a clock terminal, and an internal signal hshk from another rising edge triggered JK flip-flop 520 is applied to a K (or triggered reset) terminal. At a rising edge of signal clk_80, an output signal int_sig from flip-flop 510 is high or low depending on the states of signals int_sig, sig_80, and hshk.

As is well known for edge triggered JK flip-flops, if the output signal (int_sig) from the flip-flop (510) is high, the output signal is reset low if the signal (hshk) on the K terminal is high at the rising edge of the signal (clk_80) at the clock terminal. If the output signal (int_sig) from flip-flop 510 is low, the output signal is set high if the signal (sig_80 inverted) on the J terminal is high at the rising edge of the signal (clk_80) at the clock terminal. Otherwise the output signal is constant regardless the signals on the J and K terminals.

Flip-flop 520, which generates signal hshk, has a clock terminal coupled to receive clock signal clk_80, a J terminal coupled to receive an inverted version of signal sig_33, and a K terminal coupled to a supply voltage source Vdd. At a rising edge of clock signal clk_80 that occurs while signal sig_33 is low, flip-flop 520 asserts signal hshk high. Signal hshk remains high for only one cycle because the K terminal is kept high and flip-flop 520 resets signal hshk low in response to a rising edge in clock signal clk_80 while signal hshk is high.

Signal int_sig from a D flip-flop 530 is applied to an input terminal of a NAND gate 540, and an output terminal of NAND gate 540 is coupled to a data terminal of a flip-flop 530. Signal sig_33 from flip-flop 530 is inverted before application to the J terminal of flip-flop 520.

Figure 6:
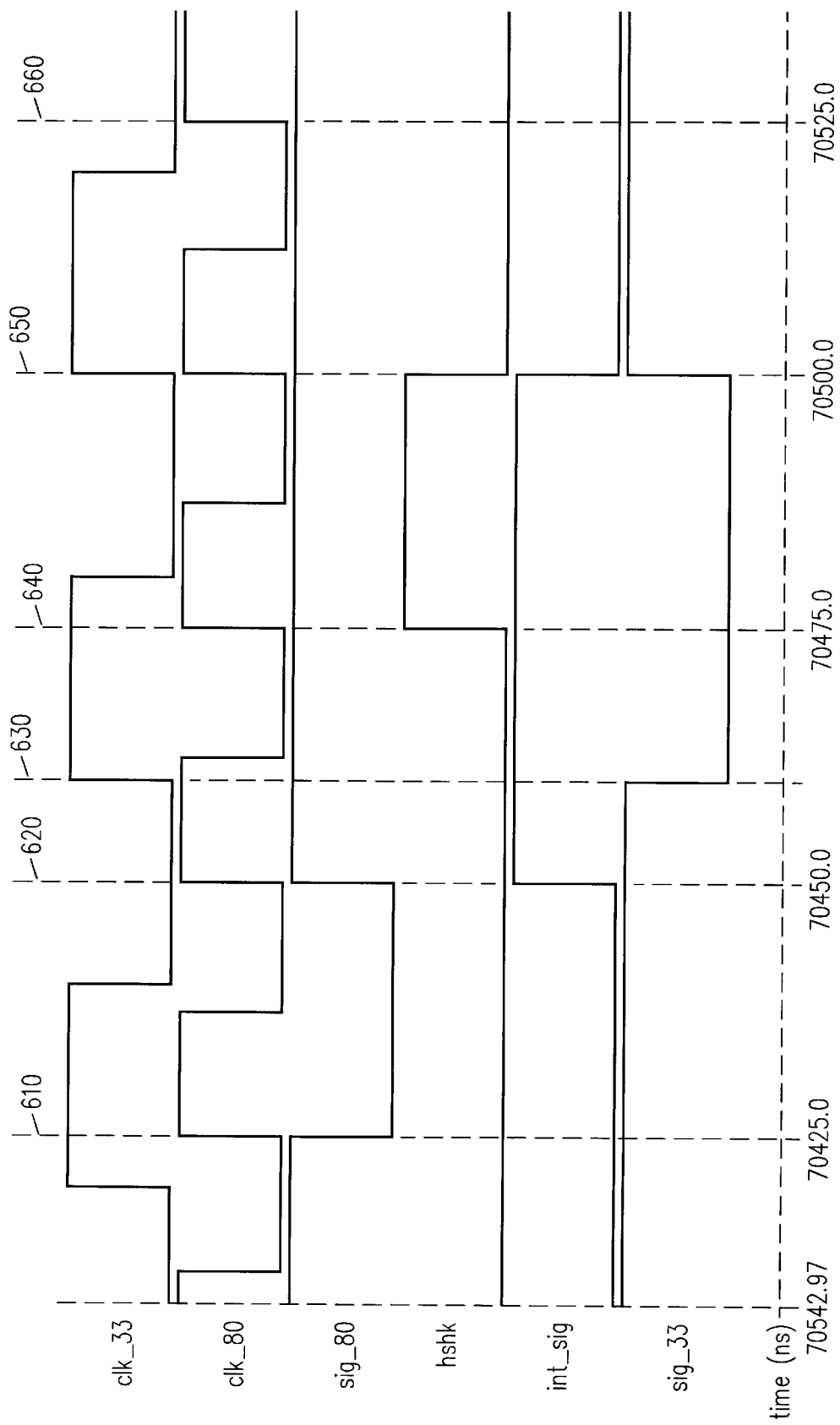
FIG. 6 is a timing diagram illustrating the operation of the synchronizer of FIG. 5.

FIG. 6 is a timing diagram illustrating operation of synchronizer 500. Initially, circuit 500 is in a state where signal sig_33 is high and signals int_sig and hshk are low. At time 610, in synchronization with a rising edge of clock signal clk_80, signal sig_80 is asserted low and remains low for one clock cycle (i.e. until time 620). The rising edge of clock signal clk_80 at time 620 triggers flip-flop 510 which sets signal int_sig high because signal sig_80 inverted is high (i.e. because signal sig_80 is low). Signal int_sig being high at the same time that signal sig_33 is high causes the output signal from NAND gate 540 to be low, so that signal sig_33 transitions to low at the next rising edge of clock signal clk_33 (e.g. at time 630). NAND gate 540 lowers the signal applied to the data input of flip-flop 530 at time 630; and at a time 650 (i.e. the next edge rising edge of signal clk_33), flip-flop 530 raises signal sig_33 back to high.

At time 640 which is before time 650, signal sig_33 is inverted so that a high level is applied to the J terminal of flip-flop 520. Flip-flop 520 sets signal hshk to high, so that at time 650, flip-flops 510 and 520 reset respective signals int_sig and hshk back to the initial states, low and high respectively. In the example of FIG. 6, rising edges of signals clk_80 and clk_33 are nearly co-incident at time 650. More generally signals hshk and int_sig return to the initial state in synchronization with signal clk_80, and signal sig_33 returns to high in synchronization with signal clk_33.

This section describes an exemplary embodiment of a PCI interface 156 which complies with the PCI Bus Specification, Revision 2.1. PCI interface 156 contains two main sections: PCI core 220 and PCI-FBUS glue logic 230. PCI interface 156 also contains Virtual Frame Buffer (VFB) logic and registers used to interface with processor 110 via FBUS 150. PCI core 220 couples to the PCI bus 110 and mainly interfaces with the external PCI devices running at the PCI bus frequency of 33 MHZ. PCI-FBUS glue logic 230 couples to PCI core 220 and to FBUS 150 which runs at 80 MHz.

For communications between PCI bus 210 and FBUS 150, addresses and data are stored in FIFO's 231 to 237 on both ends (i.e. from PCI core 220 and FBUS 150). Synchronizers 250 synchronize the PCI signals with the FBUS clock signal and visa versa. Most of the accesses of FBUS 150 are directed to the local SDRAM memory via the 64-bit data width of FBUS 150, and FBUS control 260 can be a FBUS master or a slave device.

Host interface 156 is fully compliant to the PCI 2.1 Specifications but includes additional registers for interrupt and software reset of MSP 100. Software executed by processor 110 can interrupt the host CPU by setting the PCI host interrupt request from MSP (bit<3>) of an MSP control register. This causes PCI core 220 logic to interrupt the host CPU by asserting the interrupt signal INTA# on PCI bus 210. The host CPU then acknowledges the interrupt through the PCI host interrupt acknowledge (bit<4>) in the MSP control register which causes the interrupt signal to go to inactive state.

Host interface 156 can also accept an interrupt from the host CPU, which is basically an interrupt to processor 110. Since the PCI specification does not support any interrupt output pins, "MSP Interrupt Request From Host" (bit<2>) in the MSP Control Register provides this function. The host CPU can set this bit to indicate an interrupt to processor 110. Processor 110 clears the register once the host interrupt is acknowledged.

Although the invention has been described with reference to particular embodiments, the description is only an example of the invention's application and should not be taken as a limitation. In particular, even though much of preceding discussion was aimed at a signal processor which is connected to a PCI bus, alternative embodiments of this invention are not limited to bus devices for connection to a PCI bus. Circuits described can also be adapted for general use between busses operating at different frequencies. Additionally, the particular embodiments disclosed apply rising edge triggered devices and inversion of some input and output signals. Alternative embodiments of the invention include falling edge triggers and insertion or removal of the signal inversions described. Various other adaptations and combinations of features of the embodiments disclosed are within the scope of the invention as defined by the following claims.

APPENDIX A

This appendix contains verilog code characterizing synchronizers (modules) in accordance with an embodiment of the invention. Module FC_33_80 generates from a signal sig_33, which is synchronized with a 33-MHz clock signal clk_33, a signal sig_80 which is synchronized with a 80-MHz clock signal clk_80. Module FC_80_33 generates a signal sig_33 which is synchronized with a 33-MHz clock signal clk_33, from a signal sig_80 which is synchronized with a 80-MHz clock signal clk_80.

```
module FC_33_80 (rstN, clk_33, clk_80, sig_33, sig_80);
input      clk_33;
input      clk_80;
input      sig_33;
input      rstN;
output     sig_80;
reg        sig_33_wrt_80;
reg        sync_sig33_to_80;
wire       sig_80 = (sync_sig33_to_80 | sig_33_wrt_80);
    // Initially the sig_33 is synchronized to 80 MHz using
    // 'sync_sig33_to_80'. Based on this signal a single
    // pulse is generated called sig_33_wrt_80. A single
    // pulse sig_80 is then generated based on above two
    // signals.
    always @ (posedge clk_80)
    begin
        sync_sig33_to_80 <= sig_33;
    end
    // sig_33_wrt_80 mhz, is the signal which runs on
    // 80 mhz but follows the sig_33 signal.
    always @ (posedge clk_80 or negedge rstN)
    begin
        if (!rstN)
            sig_33_wrt_80 <= 1'b0;
        else begin
            if (sync_sig33_to_80 == 1'b0 &
                sig_33_wrt_80 == 1'b0)
                sig_33_wrt_80 <= 1'b1;
            else if (sync_sig33_to_80 == 1'b1 &
                sig_33_wrt_80 == 1'b1)
                sig_33_wrt_80 <= 1'b0;
        end
    end
endmodule
module FC_80_33 (rstN, clk_80, clk_33, sig_80, sig_33);
input      rstN;
input      clk_80;
input      clk_33;
input      sig_80;
output     sig_33;
reg        sig_33;
reg        int_sig;
reg        hshk;
    always @ (posedge clk_80 or negedge rstN)
    begin
        if (!rstN)
            int_sig <= 1'b0;
        else begin
            if (hshk == 1'b1 & int_sig == 1'b1)
                int_sig <= 1'b0;
            else if (sig_80 == 1'b0)
                int_sig <= 1'b1;
        end
    end
    always @ (posedge clk_33 or negedge rstN)
    begin
        if (!rstN)
            sig_33 <= 1'b1;
```

-continued

```
        else begin
            if (int_sig == 1'b1 & sig_33 == 1'b1)
                sig_33 <= 1'b0;
            else if (sig_33 == 1'b0)
                sig_33 <= 1'b1;
        end
    end
    always @ (posedge clk_80 or negedge rstN)
    begin
        if (!rstN)
            hshk <= 1'b0;
        else begin
            if (hshk == 1'b0 & sig_33 == 1'b0)
                hshk <= 1'b1;
            else if (hshk == 1'b1)
                hshk <= 1'b0;
        end
    end
endmodule
```

We claim:

1. A bus interface comprising
    a first bus control circuit which operates at a first frequency of a first bus and implements a bus protocol for communications on the first bus;
    a second bus control circuit which operates at a second frequency of a second bus and implements a bus protocol for communications on the second bus, wherein the second frequency is independent of the first frequency;
    a first first-in-first-out buffer coupled between the first and second busses; and
    a synchronizer coupled between the first bus control circuit and the second bus control circuit, wherein the synchronizer comprises:
        a first JK flip-flop having a clock terminal coupled to receive a second clock signal, a first input terminal coupled to receive an input signal which is synchronized with the second clock signal;
        a second JK flip-flop having a clock terminal coupled to receive the second clock signal, a first input terminal coupled to a voltage source, an output terminal coupled to a second input terminal of the first JK flip-flop;
        a third flip-flop having a clock terminal coupled to a first clock signal and an output terminal coupled to a second input terminal of the second JK flip-flop; and
        a logic gate having a first input terminal coupled to an output terminal of the first JK flip-flop, a second input terminal coupled to the output terminal of the third flip-flop, and an output terminal coupled to an input terminal of the third flip-flop.

2. The bus interface of claim 1, wherein the first bus operates at the frequency of the first clock signal, and the second bus operates at the frequency of the second clock signal.

3. The bus interface of claim 2, wherein the first bus is a PCI bus.

4. A synchronizer comprising:
    a first JK flip-flop having a clock terminal coupled to receive a first clock signal, a first input terminal coupled to receive an input signal which is synchronized with the first clock signal;
    a second JK flip-flop having a clock terminal coupled to receive the first clock signal, a first input terminal coupled to a voltage source, an output terminal coupled to a second input terminal of the first JK flip-flop;
    a third flip-flop having a clock terminal coupled to a second clock signal and an output terminal coupled to a second input terminal of the second JK flip-flop; and a logic gate having a first input terminal coupled to an output terminal of the first JK flip-flop, a second input terminal coupled to the output terminal of the third flip-flop, and an output terminal coupled to an input terminal of the third flip-flop.

5. The synchronizer of claim 4, wherein the third flip-flop is a D flip-flop.

6. The synchronizer of claim 4, wherein the logic gate is a NAND gate.

7. The synchronizer of claim 4, wherein the second JK flip-flop has a second input terminal which is coupled to a constant voltage source.

8. The synchronizer of claim 7, wherein the second input terminal is a reset terminal to which the constant voltage source applies a constant voltage, and in response to an output voltage on the output terminal of the second JK flip-flop being high, an edge of the first clock signal causes the second JK flip-flop to reset the output voltage to a low level.

9. The synchronizer of claim 7, wherein the first input terminals of the first and second JK flip-flop are set terminals, and the second input terminals of the first second JK flip-flops are reset terminals.

* * * * *